3 Sheets—Sheet 1.
G. T. PALMER, Dec'd.
J. Palmer, Assignee of A. Palmer, Administratrix.
Children's Carriage.
No. 199,097. Patented Jan. 8, 1878.
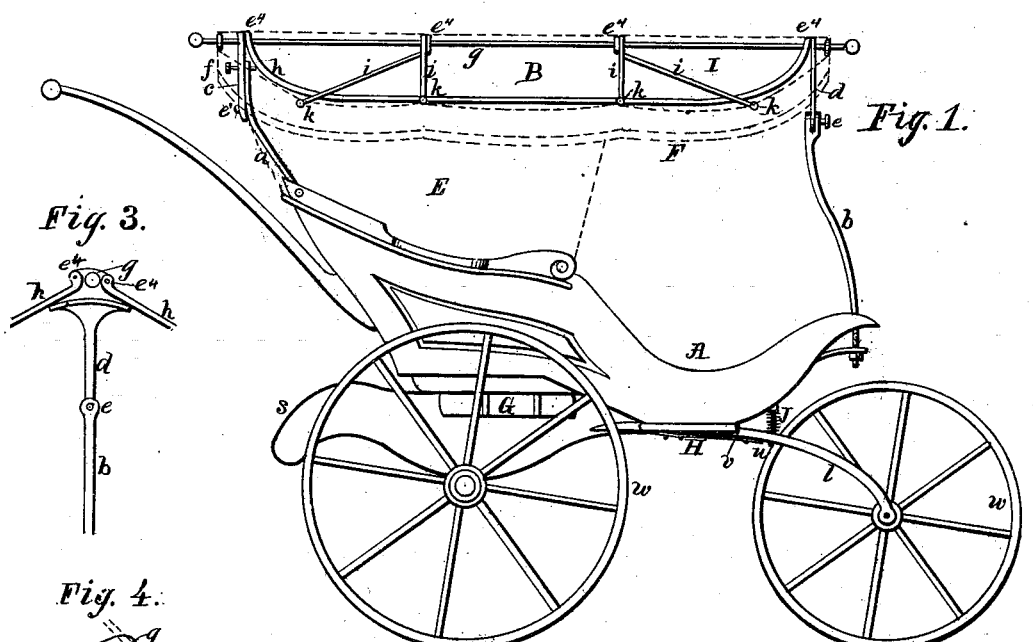
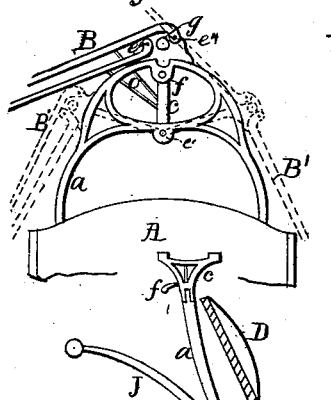
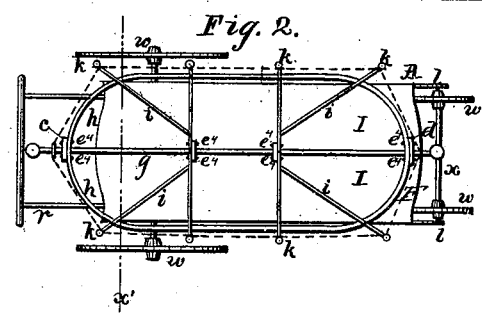
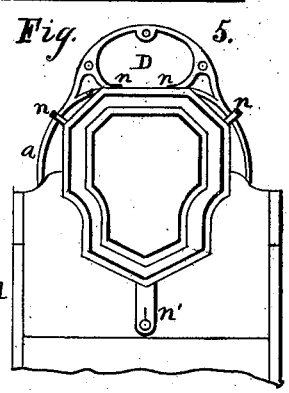
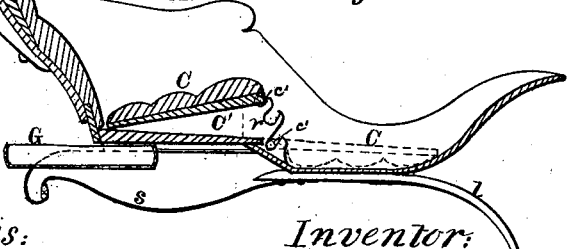
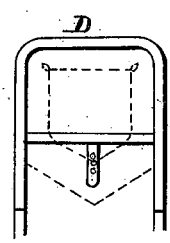
Witnesses: Inventor:
Chas. E. Frost
Ja.s Palmer George T. Palmer
N. PETERS, PHOTO-LITHOGRAPHER, WASHINGTON, D. C.

3 Sheets—Sheet 2.

G. T. PALMER, Dec'd.
J. Palmer, Assignee of A. Palmer, Administratrix.
Children's Carriage.

No. 199,097. Patented Jan. 8, 1878.

Witnesses:
Chas. E. Frost
Jas. Palmer

Inventor:
George T. Palmer.

3 Sheets—Sheet 3.

G. T. PALMER, Dec'd.
J. Palmer, Assignee of A. Palmer, Administratrix.
Children's Carriage.

No. 199,097.   Patented Jan. 8, 1878.

Witnesses:
Chas E. Frost
Jas. Palmer

Inventor:
George T. Palmer

UNITED STATES PATENT OFFICE.

GEORGE T. PALMER, OF BROOKLYN, NEW YORK, (ANN PALMER, ADMINISTRATRIX,) ASSIGNOR TO JAMES PALMER, OF SAME PLACE.

IMPROVEMENT IN CHILDREN'S CARRIAGES.

Specification forming part of Letters Patent No. 199,097, dated January 8, 1878; application filed August 15, 1871.

*To all whom it may concern:*

Be it known that I, GEORGE T. PALMER, of Brooklyn, in the county of Kings and State of New York, have invented certain Improvements in Children's Carriages or Perambulators, of which the following is a specification:

This invention consists in a carriage-top composed of separately-hinged sections, and supported so as to be capable of being turned down from over the body of the carriage, and also in a turn-over seat arranged to lie on the bottom of the carriage-body.

Like letters in the different figures of the drawings, which form part of this specification, indicate like parts.

Plate 1: Figure 1 is a side elevation of a child's carriage or perambulator with a top held suspended on rear and front central supports. Fig. 2 is a plan of the supporting-frame of the top in Fig. 1. Fig. 3 is a portion of the front top-support and top-supporting frame in Fig. 1. Fig. 4 is a plan of the rear top-support, with part of the top-supporting frame attached thereto. Fig. 5 is a portion of the carriage-body, showing the back of the seat and a head-rest attached to the rear top-support. Fig. 6 is a vertical lengthwise section of the carriage-body, showing the seat elevated at its front part to form a reclining-seat, also the seat brought forward in the bottom of the body to form an even floor with the seat-rest, and a removable head-rest attached to the back of the body, also a drawer under the rear part of the carriage-body.

Figure 7:
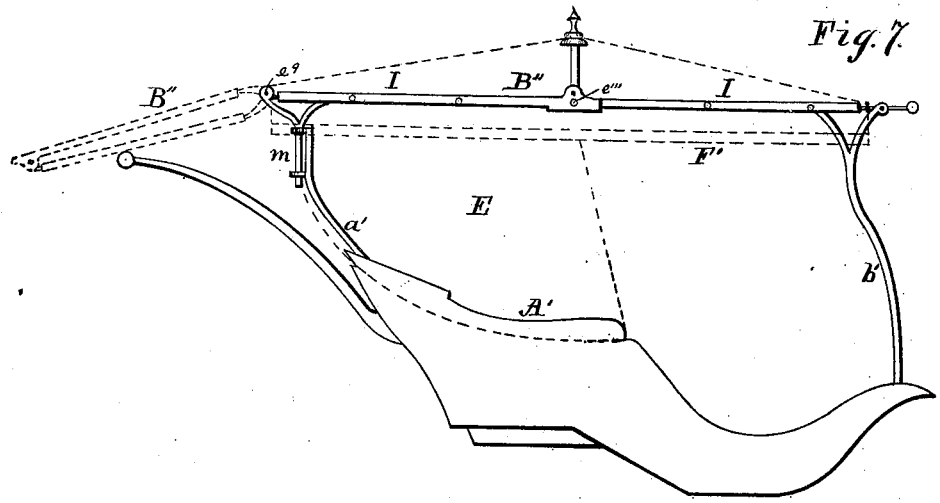
Figure 8:
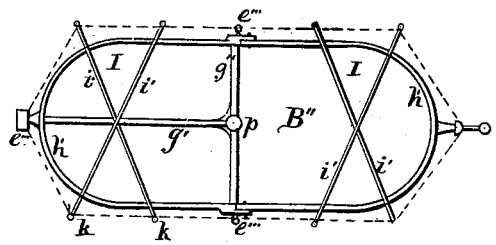
Figure 9:
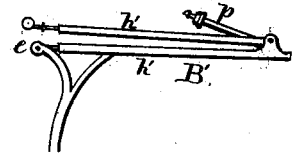
Figure 10:
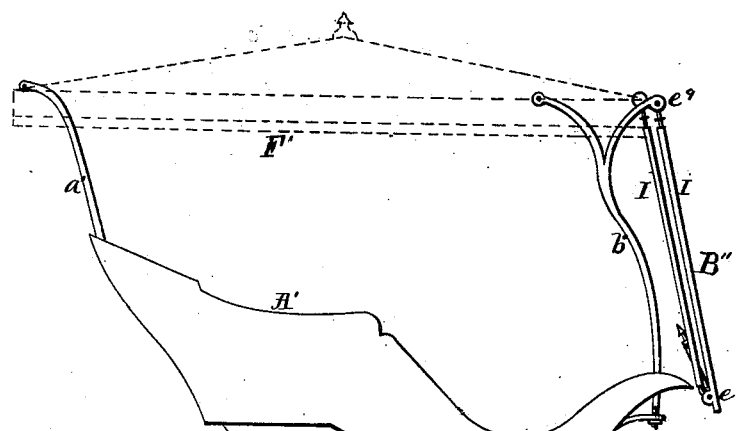

Plate 2: The figures in this plate show modifications in the manner of constructing the top-supporting frame and of attaching it to its supports. Fig. 7 is a side elevation of the carriage-body, having a top-supporting frame hinged so that the parts thereof may fold over lengthwise of the body, and that the top may turn lengthwise from over the body. Fig. 8 is a plan of the top-supporting frame in Fig. 7. Fig. 9 shows the top-frame in Figs. 7 and 8 with one part folded over and resting on one support, and Fig. 10 shows the top-frame in Fig. 7 with one part folded, also the top turned on the front support from over the carriage-body.

Figure 11:
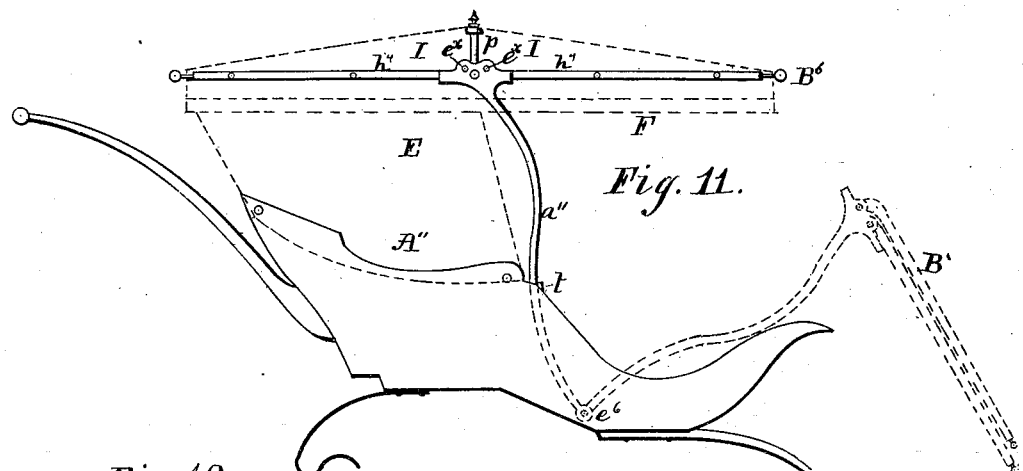
Figure 12:
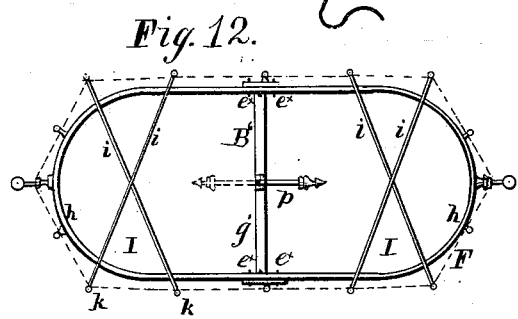
Figure 13:
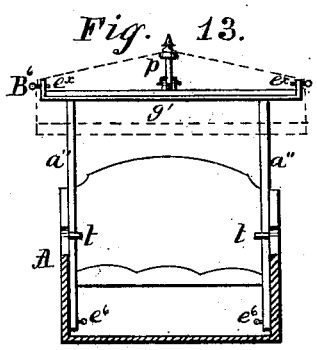
Figure 14:
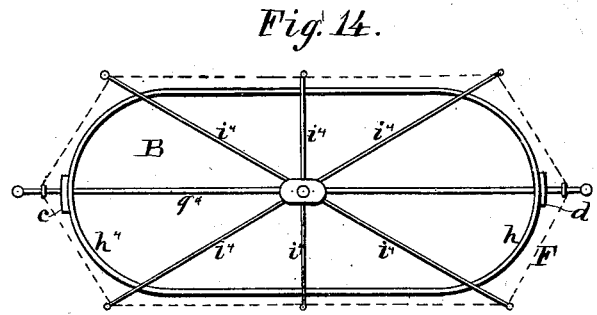
Figure 15:
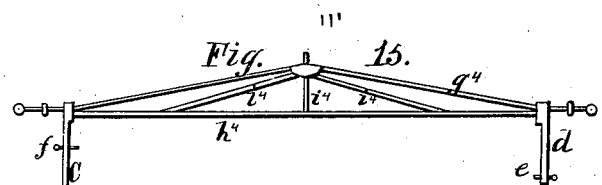

Plate 3: The figures in this plate show modifications in supporting the top and in making a top-supporting frame. Fig. 11 is a side elevation of the carriage-body, with a top which is held suspended by supports attached to the top-frame at its sides and pivoted to the sides of the carriage-body. Fig. 12 is a plan of the top-frame in Fig. 11. Fig. 13 shows a cross-section of the carriage-body, with the top-frame and its side supports. Fig. 14 is a top-supporting frame formed without hinged parts. Fig. 15 is a side elevation of Fig. 14, showing the rim of the frame and the central rod $g$.

In Figs. 1, 2, 3, 4, 5, and 6, A is the body of the carriage. $s$ are springs. $l$ are sills; $w$ $w$, wheels; G, a drawer or receptacle under the body; B, a carriage-top-supporting frame; F, a cloth cover to frame B. E are side curtains buttoned to frame B. $a$ is a rear central support to the carriage-top, and $b$ is a front support thereto. D is a head-rest. C is a seat. $r$ is a rack on the inside of the body A. C' is a seat-rest. J is a push-handle. $e$ $e$ are hinges or pivots, upon which the entire top may be turned to either side.

The frame B is made of a central lengthwise bar, $g$, to which is attached the folding parts or wings $h$ $h$ by hinges $e^4$ $e^4$. The wings $h$ are formed of a bent rod or rim and braces $i$ $i$. $k$ $k$ $k$ are buttons or knobs, on which to secure the cover F.

The supports $a$ and $b$ are secured to the rear and front of the carriage-body. The upper part of the rear support $a$ is formed as a half-circle. $c$ is a support pivoted on $a$, at $e^1$, and is provided with a bolt, $f$, and a clip which overlaps the support $a$. The support $c$ is made to traverse the circular top of $a$, on which are holes for the bolt $f$ to hold the support $c$ in any required position.

The support $d$ is pivoted on $b$ at $e$, and both the top-supports $c$ and $d$ are rigidly secured to the frame B, and turn together. The dotted lines B' in Fig. 4 show the support $c$ turned on the pivot $e^1$ from a vertical position and the top-frame B turned over to the sides of the carriage-body. $o$ $o$ are straps to hold the wings $h$ in a spread position.

By thus making the parts of the carriage-top and its supports, the wings $h$ may be folded from over either side of the carriage-body, and the top may be turned over to the sides, or held in any position over the carriage-body, and shifted to any position from the back of the carriage.

The knobs or buttons $k$ on the frame B and the cover F, being made with corresponding button-holes, will afford great facility to attach to or detach the cover from the frame for cleansing or change.

The side curtains E are buttoned to the frame B and body A. The side curtains are not a necessity in combination with this arrangement of the top and supports, but may be used, if preferred.

In Fig. 5 the head-rest D is attached to the support $a$ by fastenings $n\ n$, and in Fig. 6 it is attached to the back of the carriage-seat, and is shown detached by D under body A.

In Fig. 6 the adjustable seat C over the seat-rest C' is shown with its front part raised by pins $c'$ on its sides, on the racks $r$, to form a back-reclining seat. By lowering the seat, with its pins in the lower notch of racks $r$, the seat will be in a horizontal position, and by turning the seat over forward on its pins it will fill the front of the body, to make an even floor with the seat-rest.

The drawer G is made to slide, and is a convenience with this style of carriage-body.

In Figs. 7, 8, 9, and 10, A' is a carriage-body. B'' is a carriage-top frame, of which $g'$ is a lengthwise bar, and $g''$ a cross-bar attached to one part of the frame. $i'\ i'$ are cross-braces attached to the rim of the frame. The frame B'' is made of two wings, which fold over lengthwise from the hinged joints $e'''$.

$p$ is a post, which is pivoted to the center of frame B, to hold the cover F' elevated in the center, as shown by the dotted lines F', Fig. 7. When one part of frame B'' is folded over, the post $p$ will fold in the same direction, as shown in Fig. 9, and when the frame is spread the post $p$ will be elevated.

$a'$ and $b'$, Fig. 7, are rear and front central supports to the carriage-top.

By means of the hinges $e'''$ on frame B'' part of the top may be folded over on another part, and by the hinges $e^9$ on the supports the top may be turned from over the carriage-body.

In Figs. 11, 12, and 13, A'' is a carriage-body; B$^6$, an overfolding carriage-top frame. $a''\ a''$ are side supports, which are attached to a cross-bar, $g'$, which is pivoted to the sides of frame B$^6$ at $e^x$, and hinged to the sides of the body A'' at $e^6$. $t\ t$ are spring catches or pins, which hold the supports in a vertical position and the top suspended over the carriage-body.

By releasing the supports $a''\ a''$ from the fastenings $t\ t$, the top may be folded from over the body A'', as shown by the dotted lines, Fig. 11.

The top-supporting frame, Figs. 14 and 15, is composed of a lengthwise rod, $g^4$, bent upward to a point at its center, bent rim-braces $i^4\ i^4$, and knobs or buttons $k\ k$, the parts of which are all fastened at the points of contact. This top may be used instead of the folding top-frames, if desired.

The supports $a''\ a''$ are hinged and arranged to turn the top over the front of the carriage-body, with the view of attaching a head-rest to the back of the seat, as shown in Fig. 6; but the supports may be hinged and retained in any suitable manner to make a long or a short throw of the top, either over the rear or front of the carriage-body.

I wish to be understood that I do not confine myself to making and hinging the parts of the supporting top-frames in the exact proportions herein shown, as the parts may be varied according to circumstances or desire. The supports may be hinged to adapt them to any modification for the movement of the top.

The carriage-top may be held suspended by the rear support $a\ c$ without the aid of the front support $b$, if desired; and the parts $c$ and $d$ may be permanently jointed to the parts $a$ and $b$, and made detachable from the frame B.

I am aware that carriage-tops made with a frame of folding hoops hinged to the sides of the carriage-body, which form both top and side supports, and permanent tops suspended on fixed supports, have been used for a long period; but my improvements in carriage-tops and their supports relate principally to carriage-tops made with hinged parts or wings, which fold on other parts independently of the supports which hold the top suspended over the carriage-body, and the combination of a carriage-top with supports that are hinged in a manner that the top may be folded or turned from over the carriage-body independently of folding the top; also, that the top may be folded on itself, and be turned on its supports from over the carriage-body at the same time.

Having thus described my improvements in children's carriages or perambulators, I claim—

1. A child's-carriage top composed of two separate hinged sections, both adapted to be folded either upon the other, substantially as set forth.

2. The combination, with a top-frame, B, and body A, of the central front and rear supports $a\ b$ and pivoted top-arms $d\ c$, substantially as set forth.

3. The combination, with the wagon-body, of the pivoted seat C, arranged to turn forward and form a portion of a flat bottom on a line with the seat-rest C', substantially as set forth.

GEORGE T. PALMER.

Witnesses:
CHAS. E. FROST,
JAS. PALMER.